(12) United States Patent
Takamatsu et al.

(10) Patent No.: US 11,221,304 B2
(45) Date of Patent: *Jan. 11, 2022

(54) METHOD FOR MEASURING STRESS

(71) Applicant: Kobe Steel, Ltd., Kobe (JP)

(72) Inventors: Hiroyuki Takamatsu, Kobe (JP);
Toshihide Fukui, Kobe (JP); Mariko Matsuda, Takasago (JP); Tatsuhiko Kabutomori, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 132 days.

This patent is subject to a terminal disclaimer.

(21) Appl. No.: 16/608,582

(22) PCT Filed: Apr. 6, 2018

(86) PCT No.: PCT/JP2018/014768
§ 371 (c)(1),
(2) Date: Oct. 25, 2019

(87) PCT Pub. No.: WO2018/221009
PCT Pub. Date: Dec. 6, 2018

(65) Prior Publication Data
US 2020/0141885 A1    May 7, 2020

(30) Foreign Application Priority Data

May 31, 2017  (JP) .............................. JP2017-108133

(51) Int. Cl.
*G01N 23/207* (2018.01)
(52) U.S. Cl.
CPC ...................... *G01N 23/207* (2013.01); *G01N 2223/0566* (2013.01); *G01N 2223/50* (2013.01); *G01N 2223/607* (2013.01)

(58) Field of Classification Search
CPC ................. G01N 23/00; G01N 23/207; G01N 23/20016; G01N 2223/50;
(Continued)

(56) References Cited

U.S. PATENT DOCUMENTS

| 6,493,420 | B2 | 12/2002 | Ruud | |
| 10,914,692 | B2 * | 2/2021 | Takamatsu | ............. G01N 23/20 |
| | | | | 378/72 |
| 2002/0051514 | A1 | 5/2002 | Ruud | |

FOREIGN PATENT DOCUMENTS

| JP | 50-147983 | 11/1975 |
| JP | 2005-241308 A | 9/2005 |
| JP | 2011-27550 A | 2/2011 |

OTHER PUBLICATIONS

Extended European Search Report dated Mar. 4, 2021 in corresponding European Patent Application No. 18809347.0, 15 pages.
(Continued)

*Primary Examiner* — Jurie Yun
(74) *Attorney, Agent, or Firm* — Oblon, McClelland, Maier & Neustadt, L.L.P.

(57) ABSTRACT

A method for measuring the stress of a concave section of a test subject which comprises a metal and has a surface and a concave section, the method including: a detection step for detecting, using a two-dimensional detector, a diffraction ring of diffracted X-rays which is formed by causing X-rays to be incident on the concave section and to be diffracted by the concave section; and a calculation step for calculating the stress of the concave section on the basis of the detection results during the detection step. Therein, the detection step involves causing X-rays to be incident on each of a plurality of sites inside the concave section of the test subject, and detecting, using a two-dimensional detector, the diffraction ring formed by the diffraction of the X-rays by the concave section.

10 Claims, 3 Drawing Sheets

(58) Field of Classification Search
CPC ..... G01N 2223/0566; G01N 2223/607; G01N 2223/624; G01L 1/00; G01L 1/25
See application file for complete search history.

(56) References Cited

OTHER PUBLICATIONS

Hempel Nico et al.: "Study on the Residual Stress Relaxation in Girth-Welded Steel Pipes under Bending Load using Diffraction Methods", Materials Science and Engineering: A, vol. 688, Feb. 2, 2017, pp. 289-300.
Goudeau Philippe et al.: "Mesoscale x-ray Diffraction Measurement of Stress Relaxation Associated with Buckling in Compressed Thin Films", Applied Physics Letters, vol. 83, Jul. 7, 2003, pp. 51-53.
Bob B. He: "Measurement of Residual Stresses in Thin Films by Two-Dimensional XRD", Materials Science Forum, vol. 524-525, Sep. 1, 2006, pp. 613-618.
International Search Report dated Jun. 26, 2018 in PCT/JP2018/014768 filed Apr. 6, 2018.

* cited by examiner

METHOD FOR MEASURING STRESS

TECHNICAL FIELD

The present invention relates to a method for measuring stress in a target object.

BACKGROUND ART

During these years, as can be found in PTL 1 and the like, two-dimensional detection methods (so-called cos a methods) employing a two-dimensional detector are widely used as nondestructive methods for measuring stress (residual stress) in a target object composed of a metal. In these methods, stress is measured on the basis of a diffraction ring of a diffracted X-ray generated as an X-ray incident on a target object at a certain incidence angle $\Psi$ is diffracted from the target object. The measurement accuracy of the two-dimensional detection method is substantially proportional to sin 2$\Psi$ and decreases as the incidence angle $\Psi$ of an X-ray incident on a target object changes from 45°. For this reason, the incidence angle $\Psi$ of an X-ray on a target object is usually set within a range of 25° to 65° in the two-dimensional detection methods. In PTL 1, the incidence angle $\Psi$ is set at 30°.

Although stress in relatively flat parts of a target object can be accurately measured using the two-dimensional detection methods, it is difficult to accurately measure stress in concavities of a target object. More specifically, when a part of a target object to be measured is a concavity that recesses from surfaces of parts therearound, an incident X-ray and a diffracted X-ray interfere with the target object, and a clear diffraction ring is not detected or, even if a diffraction ring is detected, accuracy decreases in parts of the diffraction ring obtained by a diffracted X-ray that has passed near the target object. It is therefore difficult to secure a sufficiently large incidence angle $\Psi$ of an incident X-ray. As a result, it is difficult to accurately measure stress in concavities using two-dimensional detection methods. In other words, when stress in a concavity needs to be accurately measured, it is usually difficult to employ a two-dimensional detection method.

CITATION LIST

Patent Literature

PTL 1: Japanese Unexamined Patent Application Publication No. 2011-27550

SUMMARY OF INVENTION

An object of the present invention is to provide a method for measuring stress capable of accurately measuring stress in concavities of a target object using a two-dimensional detection method.

A method for measuring stress according to an aspect of the present invention is a method for measuring stress in a concavity of a target object, which is composed of a metal and includes a surface and the concavity, the concavity being provided in the surface and extending like a groove. The method includes the steps of causing X-rays to be incident on the concavity and detecting, using a two-dimensional detector, diffraction rings of diffracted X-rays generated as the X-rays are diffracted from the concavity and calculating the stress in the concavity on a basis of a result of the step of detecting. In the step of detecting, the X-rays are caused to be incident on a plurality of parts of the concavity of the target object and the two-dimensional detector detects the diffraction rings generated as the X-rays are diffracted from the concavity.

In addition, a method for measuring stress according to another aspect of the present invention is a method for measuring stress in a concavity of a target object, which is composed of a metal and includes a surface and the concavity, the concavity being provided in the surface and extending like a groove. The method includes the steps of causing X-rays to be incident on the concavity and detecting, using a two-dimensional detector, diffraction rings of diffracted X-rays generated as the X-rays are diffracted from the target object and calculating stress in the concavity on a basis of a result of the step of detecting. In the step of detecting, the X-rays are caused to be incident on a single part of the concavity of the target object at a plurality of different incidence angles and the two-dimensional detector detects the diffraction rings generated as the X-rays are diffracted from the concavity.

DESCRIPTION OF EMBODIMENTS

Preferable embodiments of the present invention will be described hereinafter with reference to the drawings.

First Embodiment

Figure 1:
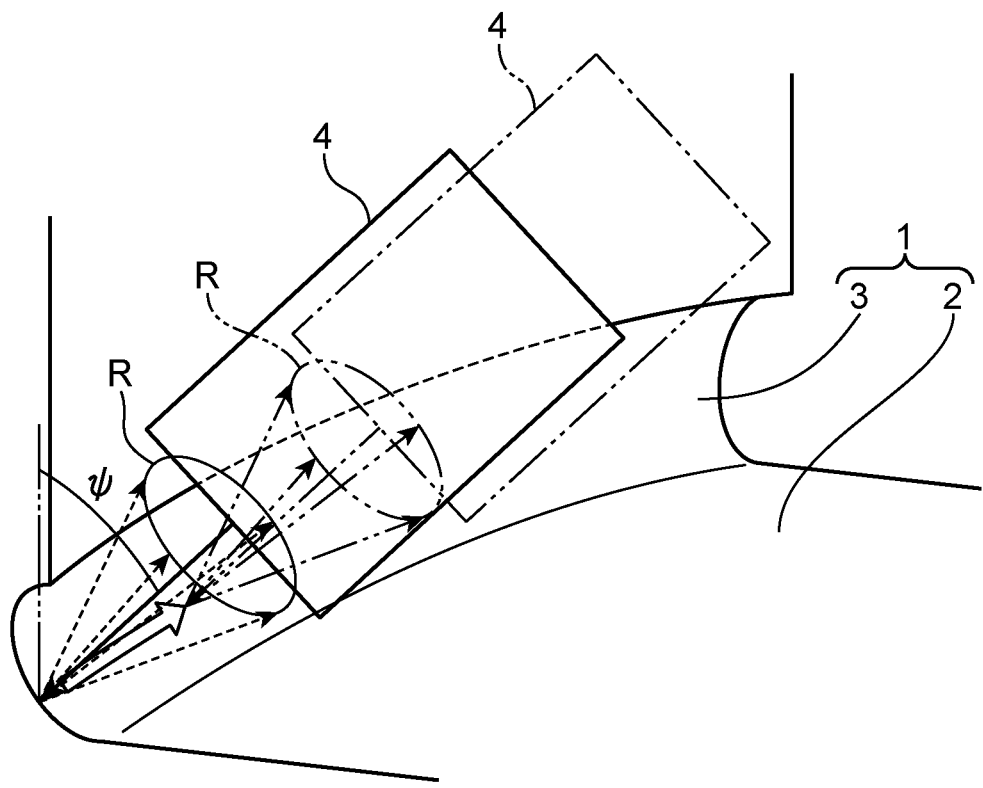
FIG. 1 is a schematic diagram illustrating a detection step of a method for measuring stress according to a first embodiment of the present invention.

A method for measuring stress according to a first embodiment of the present invention will be described with reference to FIG. 1. In the method for measuring stress, stress in a concavity 3 of a target object 1 (a crank shaft, etc.) composed of a metal such as steel is measured using a two-dimensional detector (not illustrated). As illustrated in FIG. 1, the concavity 3 recesses from the surface 2 of the target object 1 and extends like a groove. The method for measuring stress includes a detection step and a calculation step.

In the detection step, X-rays radiated from the radiation unit 4, which is capable of radiating X-rays, are incident on the concavity 3, and the two-dimensional detector detects diffraction rings R of diffracted X-rays generated as the X-rays are diffracted from the concavity 3. More specifically, in the detection step, the radiation unit 4 radiates X-rays onto a plurality of parts of the concavity 3 at a certain incidence angle $\Psi$, and the two-dimensional detector detects the diffraction rings R generated as the X-rays are diffracted from the concavity 3. At this time, the radiation unit 4 may move with the target object 1 fixed, or the target object 1 may move with the radiation unit 4 fixed. In addition, as the plurality of parts, continuous parts of the concavity 3 of the concavity 3 are selected. More preferably, parts continuous in a direction in which the concavity 3 extends are selected. In the detection step, the radiation unit 4 successively causes X-rays to be incident on the continuous parts at the certain incidence angle Ψ, and the two-dimensional detector detects a single diffraction ring R obtained by superimposing together a plurality of diffraction rings R generated as the X-rays are diffracted from the parts. The area of the X-rays radiated onto the continuous parts of the concavity 3 is preferably set more than a certain number of times (e.g., 18,000 times) larger than the grain size of the target object 1. In the present embodiment, the incidence angle Ψ of the X-rays on the concavity 3 set at a low incidence angle of 5° to 20°.

In the calculation step, stress in the concavity 3 is calculated on the basis of a result (the single diffraction ring R) of the detection performed in the detection step.

As described above, in the method for measuring stress according to the present embodiment, the two-dimensional detector detects a plurality of diffraction rings R, each of which corresponds to each of the X-rays incident on a plurality of parts of the concavity 3, in the detection step. Consequently, the amount of diffraction information (information regarding crystals involved in diffraction) included in a result of the detection performed in the detection step is larger than when only one diffraction ring R corresponding to a single X-ray incident on the concavity 3 is detected. As a result, the accuracy of calculating stress in the concavity 3 in the calculation step improves. Even if X-rays are caused to be incident on the concavity 3 at a low incidence angle of, say, 5° to 20°, therefore, stress in the concavity 3 can be accurately measured. As a result, in the method for measuring stress according to the present embodiment, even when the target object 1 has a shape with which it is difficult to secure a sufficiently large incidence angle Ψ of X-rays incident on the concavity 3 (when the incident X-rays or diffracted X-rays interfere with the target object 1 or the radiation unit 4 interferes with the target object 1, for example, if the incidence angle Ψ is increased), stress in the concavity 3 can be accurately measured while effectively avoiding interference of the incident X-rays and the diffracted X-rays with the target object 1.

In addition, since parts of the concavity 3 continuous in the direction in which the concavity 3 extends are selected as the plurality of parts in the detection step, the accuracy of measuring stress in the concavity 3 further improves. More specifically, because stress in the concavity 3 is considered to be substantially uniform in the direction in which the concavity 3 extends, the measurement accuracy improves by detecting diffraction rings R for parts continuous in the direction.

Alternatively, parts of the concavity 3 separate from one another in the direction in which the concavity 3 extends may be selected in the detection step as the plurality of parts of the concavity 3 on which X-rays are incident, and a plurality of diffraction rings R generated as the incident X-rays are diffracted from the parts may be detected. In this case, an average of a plurality of values (values of stress) detected from the diffraction rings R is calculated in the calculation step. When parts of the concavity 3 continuous in the direction in which the concavity 3 extends are selected as the plurality of parts and X-rays are successively incident on the parts as in the above embodiment, however, operations to be performed in the detection step are simpler than when X-rays are incident on a plurality of parts of the concavity 3 separate from one another, because measurement conditions need not be set for each of the parts.

Second Embodiment

Next, a method for measuring stress according to a second embodiment of the present invention will be described with reference to FIG. 2. In the second embodiment, only differences from the first embodiment will be described, and description of the same structures, operations, and effects as in the first embodiment is omitted.

Figure 2:
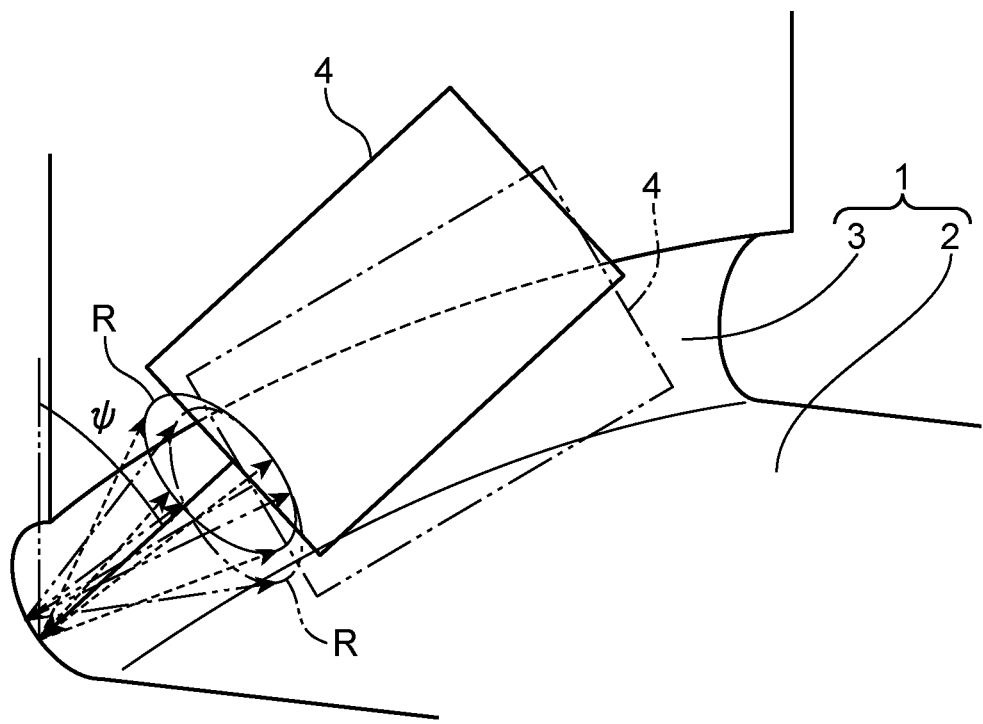
FIG. 2 is a schematic diagram illustrating a detection step of a method for measuring stress according to a second embodiment of the present invention.

In the present embodiment, as illustrated in FIG. 2, in the detection step, the radiation unit 4 radiates X-rays onto a single part of the concavity 3 at a plurality of different incidence angles Ψ, and the two-dimensional detector detects diffraction rings R generated as the X-rays are diffracted from the concavity 3. The plurality of incidence angles Ψ are selected from a range whose upper limit is obtained by increasing a particular incidence angle Ψ selected from the low incidence angles (5° to 20°) by a certain angle (around 3° to 7°) and whose lower limit is obtained by decreasing the particular angle Ψ by the certain angle. In the detection step, X-rays are successively incident on the concavity 3 from the lower limit to the upper limit, or from the upper limit to the lower limit, of the range and the two-dimensional detector detects a single diffraction ring obtained by superimposing together a plurality of diffraction rings generated as the X-rays are diffracted from the concavity 3.

As described above, in the method for measuring stress according to the present embodiment, since the two-dimensional detector detects, in the detection step, a plurality of diffraction rings R, each of which corresponds to each of the plurality of X-rays incident on the single part of the concavity 3 at the plurality of different incidence angles Ψ, the amount of diffraction information (information regarding crystals involved in diffraction) included in a result of the detection performed in the detection step is larger than when only one diffraction ring corresponding to an X-ray incident on the concavity 3 at a single incidence angle is detected. More specifically, because the entry depth of an X-ray into the concavity 3 varies depending on the incidence angle Ψ of the incident X-ray, the amount of diffraction information included in the result of the detection increases by causing X-rays to be incident on the concavity 3 at the plurality of incidence angles Ψ. As a result, the accuracy of calculating stress in the concavity 3 in the calculation step improves.

EXAMPLES

Next, examples of the above embodiments will be sequentially described. In the examples, a test sample (10 mm×10 mm) cut out from the target object 1 was used. As the target object 1, an object composed of CrMo-based low-alloy steel and an object composed of NiCrMo-based low-alloy steel were used. Cr—Kα having a wavelength of 0.117 mm was used as X-rays incident on the test samples from the radiation unit 4, and a beam diameter φ of the X-rays was about 1.5 mm. A μ-X360 manufactured by Pulstec Industrial Co., Ltd. was used as the radiation unit 4.

In the detection step in the examples, the X-rays were incident on the test samples with stress applied to the test samples by a four-point bending test machine, and the two-dimensional detector detected diffraction rings (2θ≤156°) on a diffraction plane of Fe(2, 1, 1). θ denotes a diffraction angle. In the calculation step, stress was calculated on the basis of a result of the detection.

Example of First Embodiment

Figure 3:
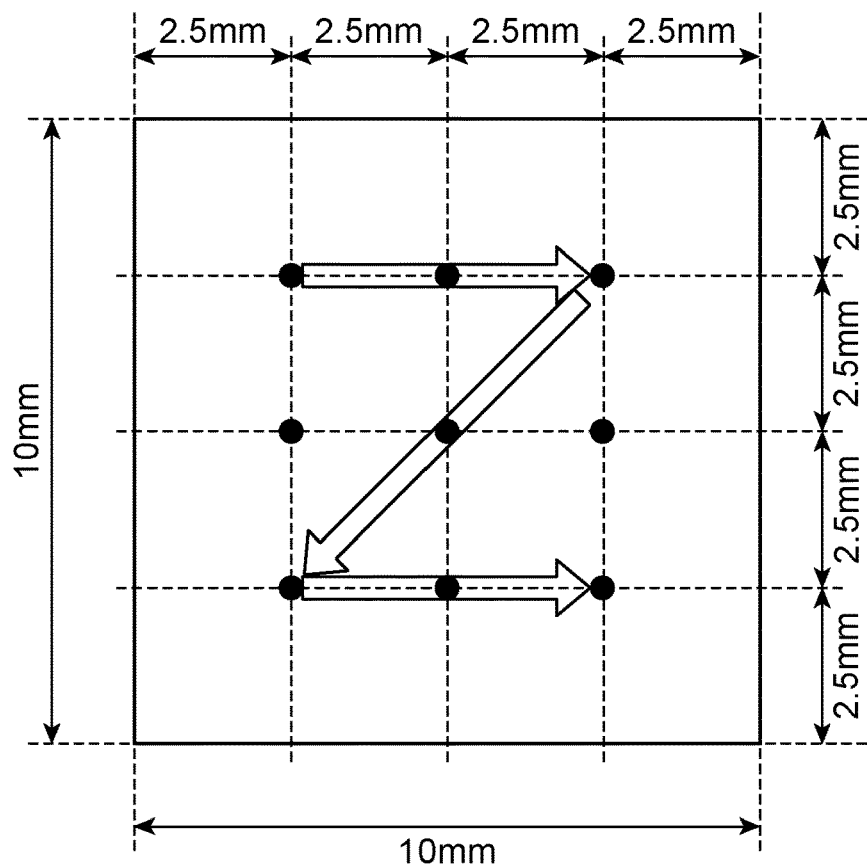
FIG. 3 is a diagram illustrating an example of a moving direction of incident X-rays in a first example.
Figure 4:
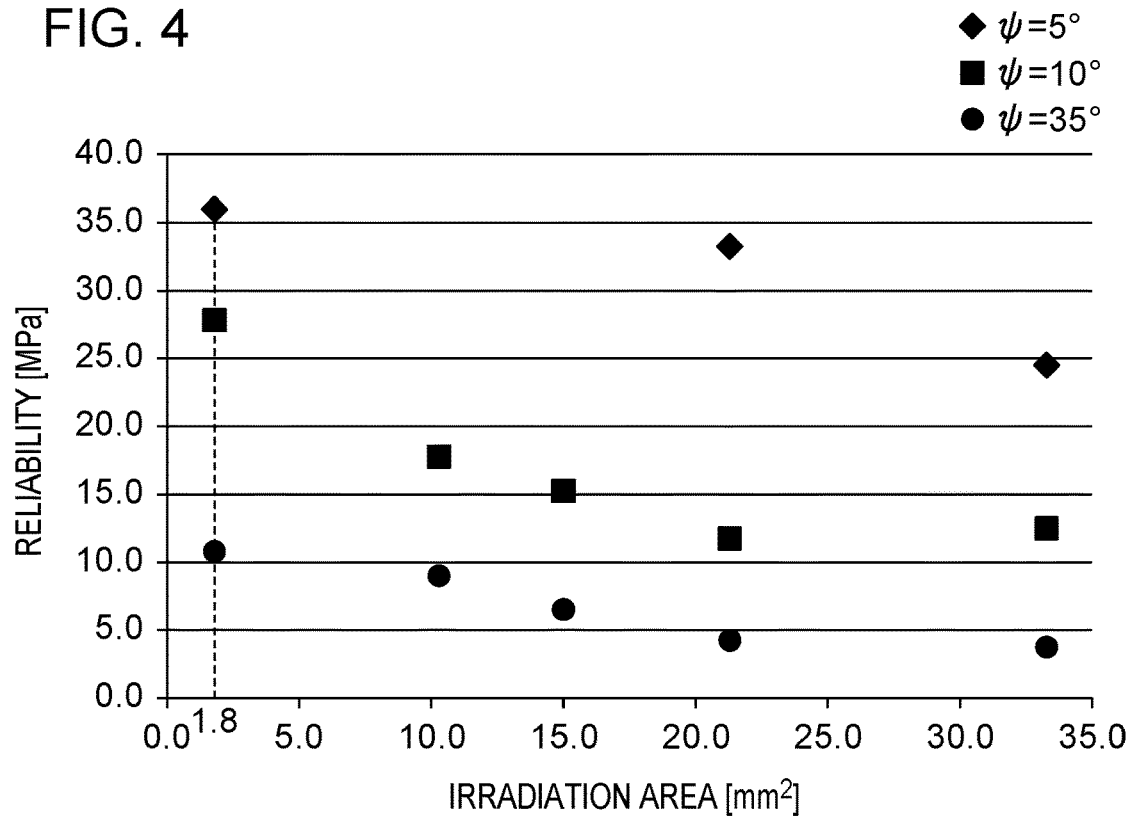
FIG. 4 is a graph illustrating a relationship between irradiation area achieved by the incident X-rays and reliability (CrMo-based low-alloy steel).
Figure 5:
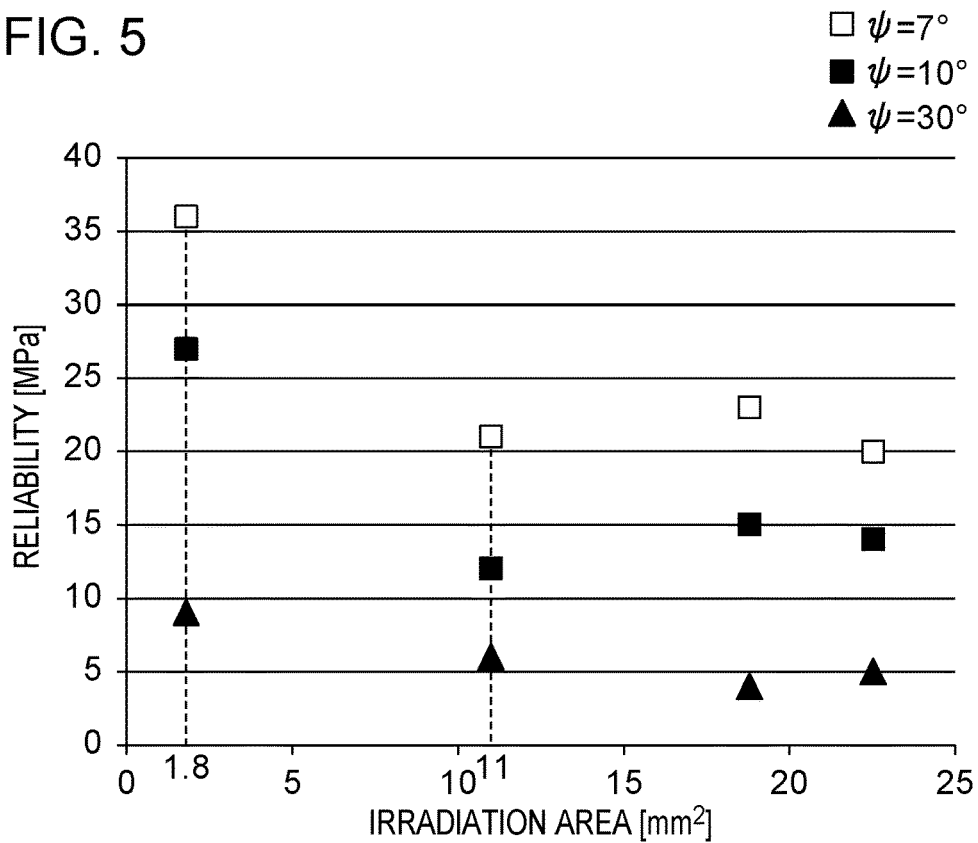
FIG. 5 is a graph illustrating a relationship between irradiation area achieved by the incident X-rays and reliability (NiCrMo-based low-alloy steel).

First, an example of the first embodiment will be described with reference to FIGS. 3 to 5. FIG. 3 illustrates an example of a moving direction of X-rays incident on the test samples. FIG. 4 is a graph illustrating a relationship between irradiation area achieved by the X-rays and reliability at a time when the incidence angle Ψ of the incident X-rays was 5°, 10°, and 35°. FIG. 4 illustrates a result at a time when the object composed of CrMo-based low-alloy steel was used as the test sample. FIG. 5 is a graph illustrating a relationship between irradiation area achieved by the X-rays and reliability at a time when the incidence angle Ψ of the incident X-rays was 7°, 10°, and 30°. FIG. 5 illustrates a result at a time when the object composed of NiCrMo-based low-alloy steel was used as the test sample. The reliability refers to a value obtained by converting, as a stress, an error (a fitting error between a calculated value based on measured diffraction rings and an ideal value) relating to linearity of a cos a diagram (a diagram equivalent to one shown in FIG. 6 of PTL 1). As the value becomes smaller, therefore, it can be evaluated that more accurate measurement has been performed.

As illustrated in FIGS. 4 and 5, it can be seen that the reliability decreases (the measurement accuracy improves) as the irradiation area increases from one (about 1.8 mm$^2$ in this example) achieved by a single X-ray. This is because the amount of diffraction information obtained from diffracted X-rays increases as the irradiation area achieved by the X-rays increases. This tendency is especially significant at low incidence angles (5° and 10° in FIG. 3 and 7° and 10° in FIG. 4). It was confirmed from FIG. 5 that the reliability tended to be saturated to a certain value when the irradiation area achieved by the X-rays was equal to or larger than 11 mm$^2$.

The irradiation area achieved by the X-rays is preferably set more than a certain number of times (18,000 times in this example) larger than the grain area of the target object 1. This is because of the following. When the grain area achieved by the target object 1 is 0.001 mm$^2$ and the irradiation area of a single incident X-ray is 1.8 mm$^2$, for example, stress is evaluated on the basis of a diffraction ring R from about 1,800 grains. If the incidence angle Ψ is 10° in this case, the measurement accuracy is about 0.34 times that at a time when the incidence angle Ψ is 45°. When the incidence angle Ψ is 10°, therefore, diffraction information needs to be increased tenfold (once a square of 0.34), that is, stress needs to be evaluated on the basis of diffraction ring R from about 18,000 grains in order to achieve substantially the same accuracy as when the incidence angle Ψ is 45°. The irradiation area achieved by the X-rays, therefore, needs to be 18 mm$^2$, which is 10 times larger than the irradiation area achieved by a single incident X-ray. The irradiation area corresponds to about 18,000 times the area of grains.

Example of Second Embodiment

Figure 6:
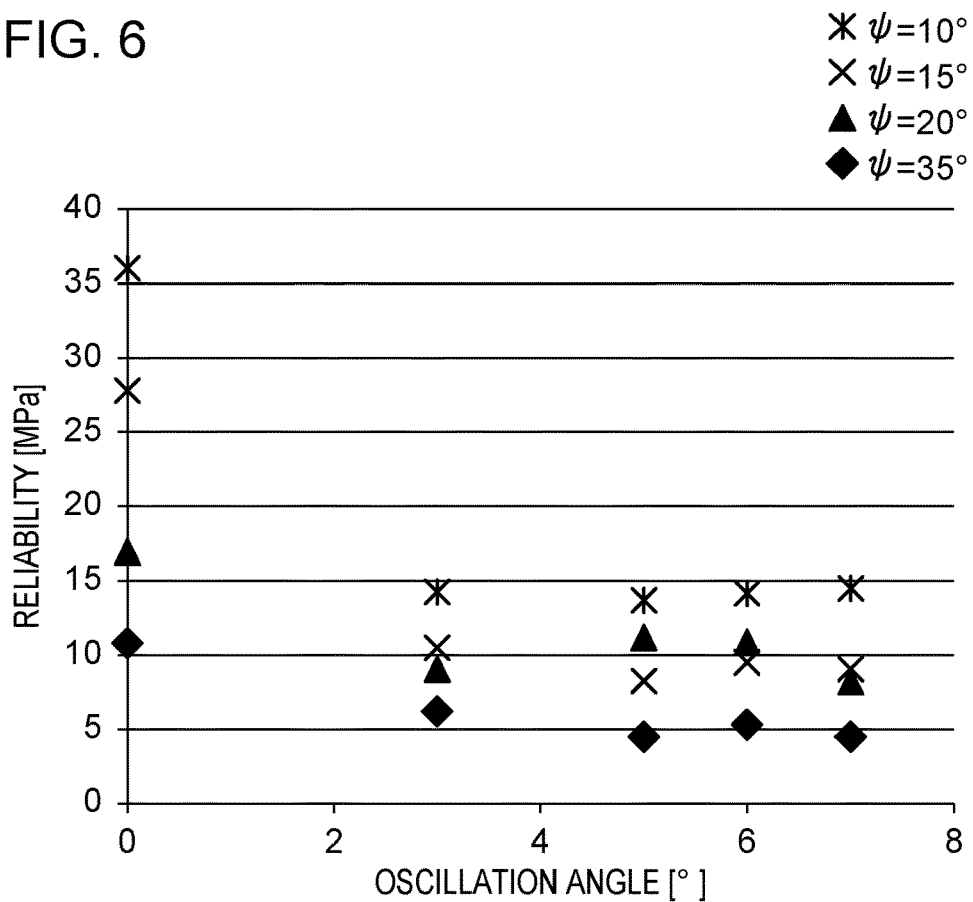
FIG. 6 is a graph illustrating a relationship (CrMo-based low-alloy steel) between an oscillation angle of incident X-rays and reliability.

Next, an example of the second embodiment will be described with reference to FIG. 6. FIG. 6 is a graph illustrating a relationship between an oscillation angle (an angle by which the incidence angle Ψ was increased and decreased) of incident X-rays and reliability at a time when the incidence angle Ψ of the incident X-rays was 10°, 15°, 20°, and 35°. FIG. 6 illustrates a result at a time when the object composed of CrMo-based low-alloy steel was used as the test sample. When the incidence angle Ψ is 10° and the oscillation angle is 3°, for example, a value of reliability is a calculated value based on diffraction rings R obtained by continuously changing the incidence angle Ψ within a range of 7° to 13°.

It can be seen from FIG. 6 that a value of reliability when the incidence angle Ψ is oscillated within a certain angular range is smaller (the measurement accuracy is higher) than a value of reliability based on a single (zero oscillation angle) X-ray. This is because the amount of diffraction information obtained from diffracted X-rays increases by changing the incidence angle Ψ by the certain angle. This is especially significant at low incidence angles (10°, 15°, and 20°).

The above embodiments will be schematically described.

The method for measuring stress according to the first embodiment is a method for measuring stress in a concavity of a target object, which is composed of a metal and includes a surface and the concavity, the concavity being provided in the surface and extending like a groove. The method includes the steps of causing X-rays to be incident on the concavity and detecting, using a two-dimensional detector, diffraction rings of diffracted X-rays generated as the X-rays are diffracted from the concavity and calculating the stress in the concavity on a basis of a result of the step of detecting. In the step of detecting, the X-rays are caused to be incident on a plurality of parts of the concavity of the target object and the two-dimensional detector detects the diffraction rings generated as the X-rays are diffracted from the concavity.

In the method for measuring stress, since the two-dimensional detector detects, in the step of detecting, the plurality of diffraction rings, each of which corresponds to each of the X-rays incident on the plurality of parts of the concavity, the amount of diffraction information (information regarding crystals involved in diffraction) included in the result of the step of detecting is larger than when only one diffraction ring corresponding to a single X-ray incident on the concavity is detected. As a result, the accuracy of calculating stress in the concavity in the step of calculating increases. Even if the X-rays are caused to be incident on the concavity at a low incidence angle of, say, 20° or lower, therefore, stress in the concavity can be accurately measured.

In this case, in the step of detecting, continuous parts of the concavity are preferably selected as the plurality of parts and the X-rays are preferably caused to be successively incident on the parts.

In doing so, measurement conditions need not be set for each of the parts of the concavity separate from one another, compared to when X-rays are individually caused to be incident on the parts. As a result, operations to be performed in the step of detecting are simplified.

Furthermore, in this case, in the step of detecting, continuous parts connected to one another in a direction in which the concavity extends are preferably selected as the continuous parts.

In doing so, the accuracy of measuring stress in the concavity further increases. More specifically, because stress in the concavity is considered to be substantially uniform in the direction in which the concavity extends, the measurement accuracy improves by detecting diffraction rings in the plurality of parts arranged in the direction.

In addition, in the step of detecting, the X-rays are preferably caused to be successively incident on the continuous parts and the two-dimensional detector preferably detects a single diffraction ring obtained by superimposing together the diffraction rings generated as the X-rays are diffracted from the parts.

In doing so, the step of detecting is further simplified.

In addition, in the step of detecting, the X-rays are preferably caused to be incident on the target object such that total irradiation area of the concavity achieved by the X-rays becomes more than a certain number of times larger than grain area of the target object.

In doing so, the amount of information included in the result of the step of detecting further increases, and the measurement accuracy further increases.

In addition, in the step of detecting, the X-rays are preferably caused to be incident on the concavity at a low incidence angle of 20° or lower.

In doing so, stress in the concavity can be accurately measured while effectively avoiding interference of the incident X-rays and the diffracted X-rays with the target object.

In addition, the method for measuring stress according to the second embodiment is a method for measuring stress in a concavity of a target object, which is composed of a metal and includes a surface and the concavity, the concavity being provided in the surface and extending like a groove. The method includes the steps of causing X-rays to be incident on the concavity and detecting, using a two-dimensional detector, diffraction rings of diffracted X-rays generated as the X-rays are diffracted from the target object and calculating stress in the concavity on a basis of a result of the step of detecting. In the step of detecting, the X-rays are caused to be incident on a single part of the concavity of the target object at a plurality of different incidence angles and the two-dimensional detector detects the diffraction rings generated as the X-rays are diffracted from the concavity.

In the method for measuring stress, since the two-dimensional detector detects, in the step of detecting, the plurality of diffraction rings, each of which corresponds to each of the X-rays incident on the single part of the concavity at the plurality of different incidence angles, the amount of diffraction information (information regarding crystals involved in diffraction) included in the result of the step of detecting is larger than when only one diffraction ring corresponding to a single X-ray incident on the concavity at a single incidence angle is detected. As a result, the accuracy of calculating stress in a concavity in the step of calculating increases. Even if the X-rays are caused to be incident on the concavity at a low incidence angle of 20° or lower, therefore, stress in the concavity can be accurately measured.

In this case, in the step of detecting, the plurality of incidence angles are preferably selected from a range whose upper limit is obtained by increasing a particular incidence angle by a certain angle and whose lower limit is obtained by decreasing the particular angle by the certain angle.

In doing so, it becomes possible in the step of detecting to obtain a large amount of diffraction information near a part (an area where stress can be evaluated to be substantially uniform) onto which the X-rays are radiated at the certain incidence angle. As a result, the measurement accuracy improves.

Furthermore, in this case, in the step of detecting, the particular incidence angle is preferably selected from low incidence angles of 20° or lower.

In doing so, stress in the concavity can be accurately measured while effectively avoiding interference of the incident X-rays and the diffracted X-rays with the target object.

The invention claimed is:

1. A method for measuring stress in a concavity of a target object, which is composed of a metal and includes a surface and the concavity, the concavity recessing from the surface and extending like a groove, the method comprising the steps of:
   causing X-rays to be incident on the concavity and detecting, using a two-dimensional detector, diffraction rings of diffracted X-rays generated as the X-rays are diffracted from the concavity; and
   calculating the stress in the concavity on a basis of a result of the step of detecting,
   wherein, in the step of detecting, the X-rays are caused to be incident on a plurality of parts of the concavity of the target object and the two-dimensional detector detects the diffraction rings generated as the X-rays are diffracted from the concavity.

2. The method for measuring stress according to claim 1, wherein, in the step of detecting, continuous parts of the concavity are selected as the plurality of parts and the X-rays are caused to be successively incident on the parts.

3. The method for measuring stress according to claim 2, wherein, in the step of detecting, parts continuous in a direction in which the concavity extends are selected as the continuous parts.

4. The method for measuring stress according to claim 3, wherein, in the step of detecting, the X-rays are caused to be successively incident on the continuous parts and the two-dimensional detector detects a single diffraction ring obtained by superimposing together the diffraction rings generated as the X-rays are diffracted from the parts.

5. The method for measuring stress according to claim 2, wherein, in the step of detecting, the X-rays are caused to be successively incident on the continuous parts and the two-dimensional detector detects a single diffraction ring obtained by superimposing together the diffraction rings generated as the X-rays are diffracted from the parts.

6. The method for measuring stress according to claim 1, wherein, in the step of detecting, the X-rays are caused to be incident on the concavity such that total irradiation area of the concavity achieved by the X-rays becomes more than a certain number of times larger than grain area of the target object.

7. The method for measuring stress according to claim 1, wherein, in the step of detecting, the X-rays are caused to be incident on the concavity at a low incidence angle of 20° or lower.

8. A method for measuring stress in a concavity of a target object, which is composed of a metal and includes a surface and the concavity, the concavity recessing from the surface and extending like a groove, the method comprising the steps of:
   causing X-rays to be incident on the concavity and detecting, using a two-dimensional detector, diffraction rings of diffracted X-rays generated as the X-rays are diffracted from the concavity; and
   calculating the stress in the concavity on a basis of a result of the step of detecting,
   wherein, in the step of detecting, the X-rays are caused to be incident on a single part of the concavity of the target object at a plurality of different incidence angles and the two-dimensional detector detects the diffraction rings generated as the X-rays are diffracted from the concavity.

9. The method for measuring stress according to the claim 8,
wherein, in the step of detecting, the plurality of incidence angles are selected from a range whose upper limit is obtained by increasing a particular incidence angle by a certain angle and whose lower limit is obtained by decreasing the particular incidence angle by the certain angle.

10. The method for measuring stress according to claim 9,
wherein, in the step of detecting, the particular incidence angle is selected from low incidence angles of 20° or lower.

* * * * *